UNITED STATES PATENT OFFICE 2,196,445

CONDENSATION PRODUCT FROM PHOSGENE AND ACETYLENE COMPOUNDS AND PROCESS OF PREPARING THE SAME

Anderson W. Ralston, Chicago, Ill., assignor to Armour and Company, Chicago, Ill., a corporation of Illinois No Drawing. Application February 24, 1938, Serial No. 192,431

6 Claims. (Cl. 260—92)

This invention relates to condensation products and processes of preparing the same, and it comprises, as a new condensation product, the reaction product between highly unsaturated hydrocarbons containing one or more triple bonds, with phosgene, and it further comprises processes wherein an acetylene, such as acetylene itself, vinyl acetylene, diacetylene, and similar hydrocarbon-substituted acetylene derivatives, are reacted with phosgene under conditions leading to the formation of liquid or plastic solid condensation products.

I have discovered that hydrocarbons containing the acetylene linkage, can be made to react with phosgene (carbonyl chloride) to give a continuous series of condensation reaction products, the properties of which are dependent upon the reaction conditions and the proportions of reacting materials. In view of the great utility in the arts of various plastic materials, the present invention is of economic significance since acetylene is readily obtainable from calcium carbide and water, and phosgene can be readily prepared by the action of chlorine on carbon monoxides.

The condensation products of the present invention are very complex and I am unable to assign definite formulas for them. They all contain carbon, hydrogen, chlorine and oxygen. When acetylene is reacted with phosgene the first reaction is probably as follows:

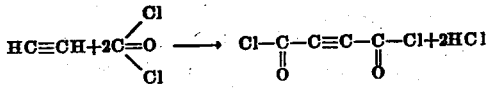

Some of the hydrochloric acid thus formed is given off and some of it appears to be retained which would be expected in view of the fact that hydrochloric acid readily reacts with acetylene, or compounds containing the acetylene bond. The first reaction product, which can be considered an acetylene derivative, thus contains highly reactive chlorine atoms which can in turn react with more acetylene, for example, in accordance with the following reaction:

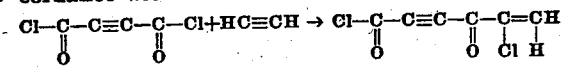

A further molecule of acetylene can react with the highly reactive chlorine attached to the carbonyl group in the above reaction and further quantities of carbonyl chloride can continue to react with acetylene hydrogens so that there is a progressive chain of reaction continuously occurring. Hydrochloric acid gas being one of the reactants possibly competes with acetylene so that the free hydrochloric acid tends to add on and hence decrease the unsaturation of the triple bonded linkages in the molecule. At the same time the initial reaction products tend to react with more acetylene. Undoubtedly, several reactions are occurring at the same time so that the final product is necessarily highly complex and of high molecular weight.

The following examples illustrate ways of preparing products of the present invention.

Ten parts by weight of liquid phosgene are charged in a cooled reaction vessel and acetylene gas is bubbled in slowly at a temperature not exceeding about —5° C. Acetylene is added over a period of about ten hours during which time the temperature rises to about 20° C. The reaction vessel is thereafter opened and the product obtained is a brown-colored liquid. When this intermediate condensation product is heated in an autoclave at a temperature of about 100° C. it is converted into a brown-colored plastic solid which can be incorporated with fillers and molded under heat and pressure. When the reaction between phosgene and acetylene is conducted at low temperatures, reaction products formed are generally liquids and can be looked upon as an initial condensation product which can be converted to a hard, infusible resin at higher temperatures.

When ten parts by weight of liquid phosgene and five parts by weight of acetylene gas are reacted in a steel autoclave at 100° C. for about ten hours, the product obtained is a brownish, low-melting solid insoluble in water but soluble in the usual organic solvents, such as gasolene, alcohol and ethers. Most probably the first reaction product is liquid as in accordance with the example given above, and this reaction product in turn condenses to a solid material.

The vinyl acetylene, ethyl acetylene, and similar substituted acetylenes react with phospene to give highly complex solid reaction products which can be incorporated with fillers and used as molding compositions.

The reaction products of the present invention are especially useful as starting materials for the preparation of organic compounds. In view of the fact that they contain chlorine linked to carbon I can prepare glycol-like products by saponifying the reaction products with caustic alkali solutions under pressure. The saponification products are polyhydroxy compounds which can in turn be hydrogenated to give polyhydroxylated hydrocarbons useful as synthetic waxes.

Although catalysts are ordinarily unnecessary for increasing the rate of reaction, catalysts can be used and I find that metallic iron and copper both appear to catalyze the reaction.

In all instances I prepare my condensation products in the entire absence of air or free oxygen. It is essential that oxygen be absent for otherwise side reactions may proceed with explosive force. Consequently, the reactions are conducted in closed vessels which have been substantially exhausted of air. This is best done by first replacing the air in the reaction vessel with nitrogen or other inert gas and then charging the vessel with the reactants.

Having thus described my invention, what I claim is:

1. The process which comprises admixing an acetylene with phosgene in the absence of oxygen and allowing reaction to occur between the acetylene and phosgene in the absence of oxygen until a complex condensation product varying from liquid to solid consistency is obtained.

2. The process which comprises admixing acetylene with phosgene in the absence of oxygen and allowing reaction to occur between the acetylene with phosgene in the absence of oxygen until a complex condensation product varying from liquid to solid consistency is obtained.

3. The process which comprises bubbling an acetylene into liquid phosgene at low temperature and in the absence of oxygen, continuing the addition of the acetylene until a liquid condensation product is obtained, which product yields an insoluble resinous material when heated.

4. The process which comprises bubbling acetylene into liquid phosgene at low temperature and in the absence of oxygen, continuing the addition of the acetylene until a liquid condensation product is obtained, which product yields an insoluble resinous material when heated.

5. As a new material a condensation product obtained by reacting phosgene with an acetylene in the absence of oxygen until a complex reaction product varying from liquid to solid consistency is obtained.

6. As a new material a condensation product obtained by reacting phosgene with acetylene in the absence of oxygen until a complex reaction product varying from liquid to solid consistency is obtained.

ANDERSON W. RALSTON.